US011165214B2

(12) United States Patent
Flaig et al.

(10) Patent No.: US 11,165,214 B2
(45) Date of Patent: Nov. 2, 2021

(54) METHODS AND LASER SYSTEMS FOR GENERATING AMPLIFIED PULSE-ON-DEMAND OUTPUT LASER PULSES

(71) Applicant: TRUMPF LASER GMBH, Schramberg (DE)

(72) Inventors: Rainer Flaig, Eschbronn (DE); Stefan Rapp, Schramberg (DE); Fred Stier, Schramberg (DE)

(73) Assignee: TRUMPF LASER GMBH, Schramberg (DE)

(*) Notice: Subject to any disclaimer, the term of this patent is extended or adjusted under 35 U.S.C. 154(b) by 119 days.

(21) Appl. No.: 16/720,441

(22) Filed: Dec. 19, 2019

(65) Prior Publication Data

US 2020/0127434 A1 Apr. 23, 2020

Related U.S. Application Data

(63) Continuation of application No. PCT/EP2018/065872, filed on Jun. 14, 2018.

(30) Foreign Application Priority Data

Jun. 20, 2017 (DE) ...................... 10 2017 210 272.1

(51) Int. Cl.
*H01S 3/00* (2006.01)
*H01S 3/10* (2006.01)
*H01S 3/23* (2006.01)

(52) U.S. Cl.
CPC .......... *H01S 3/0085* (2013.01); *H01S 3/1003* (2013.01); *H01S 3/10015* (2013.01);
(Continued)

(58) Field of Classification Search
CPC .. H01S 3/10046; H01S 3/0085; H01S 3/1024; H01S 3/0057; H01S 5/0057
See application file for complete search history.

(56) References Cited

U.S. PATENT DOCUMENTS 9,570,877 B1 * 2/2017 Ammann .................. H01S 3/11
2005/0100062 A1 * 5/2005 Grant ................. B23K 26/0853
372/10
(Continued)

FOREIGN PATENT DOCUMENTS

DE 102014017568 6/2016
FR 3042654 A1 * 4/2017 ........... H01S 3/2391
(Continued)

OTHER PUBLICATIONS

CN Office Action in Chinese Appln. No. 201880041383.3, dated Nov. 25, 2020, 26 pages (with English translation).
(Continued)

*Primary Examiner* — Joshua King
(74) *Attorney, Agent, or Firm* — Fish & Richardson P.C.

(57) ABSTRACT

Method and systems are disclosed for generating amplified output laser pulses with individually predefined pulse energies at individually predefined times at an output by providing a pulse sequence of input laser pulses having the same pulse energy and the same temporal pulse interval smaller than the temporal pulse interval between two adjacent output laser pulses, selecting the input laser pulses that arrive at the output at or about the predefined times, amplifying the selected input laser pulses with an optical amplifier, wherein at least one sacrificial laser pulse is inserted into the pulse sequence of the selected input laser pulses before the subsequent one of the two successive input laser pulses to be amplified, and reducing the pulse energies of the amplified input laser pulses to predefined pulse energies by time-controlled partial decoupling depending on their pulse
(Continued)

intervals from the corresponding immediately preceding amplified input or sacrificial laser pulse.

22 Claims, 2 Drawing Sheets

(52) U.S. Cl.
CPC ........ *H01S 3/10046* (2013.01); *H01S 3/2308* (2013.01); *H01S 3/2391* (2013.01)

(56) References Cited

U.S. PATENT DOCUMENTS

| | | | |
|---|---|---|---|
| 2014/0050235 A1* | 2/2014 | Clowes | G02F 1/353 |
| | | | 372/6 |
| 2018/0309258 A1* | 10/2018 | Honninger | H01S 3/101 |
| 2020/0350739 A1* | 11/2020 | Flaig | H01S 3/0085 |

FOREIGN PATENT DOCUMENTS

| | | |
|---|---|---|
| WO | WO 2017/068282 | 4/2017 |
| WO | WO 2018/234162 | 12/2018 |

OTHER PUBLICATIONS

DE Office Action in German Appln. No. 10 2017 210 272.1, dated Mar. 9, 2018, 17 pages (with English Machine Translation).

PCT International Preliminary Report on Patentability in International Appln. No. PCT/EP2018/065872, dated Dec. 24, 2019, 15 pages (with English translation).

PCT International Search Report and Written Opinion in International Appln. No. PCT/EP2018/065872, dated Oct. 11, 2018, 18 pages (with English translation).

* cited by examiner

METHODS AND LASER SYSTEMS FOR GENERATING AMPLIFIED PULSE-ON-DEMAND OUTPUT LASER PULSES

CROSS REFERENCE TO RELATED APPLICATIONS

This application is a continuation of and claims priority under 35 U.S.C. § 120 from PCT Application No. PCT/EP2018/065872 filed on Jun. 14, 2018, which claims priority from German Application No. 10 2017 210 272.1 filed on Jun. 20, 2017. The entire contents of each of these priority applications are incorporated herein by reference.

TECHNICAL FIELD

The disclosure relates to methods for generating amplified output laser pulses with individually specified pulse energies at individually specified time points at an output, and also to laser systems that are suitable for carrying out the method, and to associated control program products.

BACKGROUND

Short pulse laser systems (femtosecond (fs) to picosecond (ps) pulse durations) have a clock-rate-dependent laser pulse energy at constant pump power and are generally operated with a constant frequency. The user wishes to operate the laser pulses with freely selectable triggering (nanosecond (ns) jitter) and constant settable pulse energy.

DE 10 2014 017 568 A1 discloses a method for generating amplified output laser pulses at individually specified time points, which are obtained by free triggering using a pulse picker. A pulse picker consists of a modulator and a driver, with which at least three levels for different pulse amplitudes downstream of the pulse picker can be set in accordance with a specification. The modulator used is preferably an electro-optic modulator or an acousto-optic modulator.

SUMMARY

The present disclosure provides fast energy-stabilized pulse on demand (POD) methods for generating amplified output laser pulses with individually specified pulse energies at individually specified time points, and associated laser systems.

In one aspect, the disclosure features methods for generating amplified output laser pulses with individually specified pulse energies at individually specified time points at an output, which include the following method steps:

providing a pulse sequence of input laser pulses with the same pulse energy and in particular with the same temporal pulse interval, which is smaller than the temporal pulse interval between two neighboring output laser pulses;

selecting the input laser pulses that arrive at the output in each case at the specified time points or closest to the specified time points;

amplifying the selected input laser pulses using an optical amplifier having a specified, amplification-free minimum time period and a specified, amplification-free maximum time period, wherein, for the case that the temporal pulse interval between two successive input laser pulses that are to be amplified is greater than the maximum time period, at least one sacrificial laser pulse, which is spaced apart from the subsequent input pulse that is to be amplified by at least the minimum time period and by at most the maximum time period, is inserted, before the subsequent one of the two successive input laser pulses that are to be amplified, into the pulse sequence of the selected input laser pulses and wherein the at least one amplified sacrificial laser pulse is coupled out of the pulse sequence of the amplified input pulses upstream of the output, and reducing the pulse energies of the amplified input laser pulses to the specified pulse energies by way of timed partial output coupling in dependence on their pulse intervals from the respectively immediately preceding, amplified input or sacrificial laser pulse so as to obtain the output laser pulses at the output with the specified pulse energies at the specified time points.

In some embodiments, all the amplified output laser pulses have the same pulse energy.

In the new methods, after a pulse, the inversion in the gain medium of the amplifier is built up again to ensure pulse-to-pulse stability. In addition, the amplification in the case of pulse pauses that are too long will become so large that excessive pulse increases occur.

Components include laser clock processing and pulse energy correction. Laser clock processing has the task of keeping the basic clock within a frequency range that is secure for the laser system and the task of "clock in" pulse requests (pulse triggerings) made by the user with ns-precision. In addition, a check is performed as to whether the pulse request lies outside a specified time window, which is given by the behavior of the gain medium. If the pulse interval is too long, an intermediate pulse (sacrificial pulse) is inserted, which is then directed onto an absorber.

The pulse energy correction of the amplified output pulses to the specified pulse energies is effected by timed partial output coupling of the amplified output pulses in dependence on the known pulse intervals thereof from the respectively immediately preceding, amplified input or sacrificial laser pulse. The greater this pulsed distance of an amplified input laser pulse is, the greater is the inversion that has built up in the amplifier and the greater is the pulse energy of the amplified input laser pulse. In dependence on the known pulse interval from the respectively immediately preceding, amplified input or sacrificial laser pulse, a corresponding portion of the amplified output laser pulses is coupled out to obtain output laser pulses with the specified pulse energy.

The methods work by way of targeted temporal driving of the selected input laser pulses and the output coupling of the amplified input pulses. This procedure is faster than pulse energy regulation of the output laser pulses. Operation can proceed with constant pump power for the amplifier, with the result that a high thermal equilibrium and a temporally nearly constant thermal lens are achieved and, as a result, the function of the optical components is improved.

For the selected input laser pulses, the expected pulse energy of the amplified output laser pulses can be determined in advance, and the partial output coupling is controlled on the basis of a comparison of the expected pulse energy to the specified pulse energy. For example, the expected pulse energy can be determined from the simulated behavior of the amplifier in dependence on the pulse interval and pulse energy of the selected input laser pulses and the pump power of the amplifier. This simulation can be effected via a non-linear model that is a function of the pulse interval, the pulse energy of the selected input laser pulses, the power of the pulses to be amplified, and the pump power.

If the temporal pulse interval of a selected input laser pulse from the immediately preceding, selected input laser pulse is smaller than the minimum time period, a different input laser pulse is selected instead, the temporal pulse interval of which from the immediately preceding, selected input laser pulse is identical to or minimally greater than the minimum time period. For example, it is possible for a delay signal to be superposed on the actual selection signal and for an input laser pulse to be selected, the temporal pulse interval of which is identical to or minimally greater than the minimum time period. All the trigger signals selecting the input laser pulses can be subjected to a delay, with the result that the minimum time period is maintained for all trigger signals and sacrificial pulses can be inserted, if appropriate. In other words, all selected input laser pulses are subjected to a fixed delay. The minimum time period is at least long enough for an assessment as to whether sacrificial pulses are required to be able to be performed.

As a sacrificial laser pulse, one of the input laser pulses or, alternatively, an external laser pulse can be inserted into the pulse sequence of the selected input laser pulses. In some embodiments, the external laser pulse can have a different wavelength than the wavelength of the input laser pulses.

The temporal pulse interval between two neighboring output laser pulses can be greater by at least one order of magnitude than the temporal pulse interval of the input laser pulses. The clock frequency of the input laser pulses for example lies in the frequency range of for example 10 MHz to 200 MHz.

To prevent excessive increases at the first output laser pulse of a requested pulse sequence, it is advantageously possible to insert at least one sacrificial laser pulse into the pulse sequence of the selected input laser pulses before the first selected input laser pulse.

Reducing the pulse energies of the amplified input laser pulses and the output coupling of the amplified sacrificial laser pulse can be effected either at different output coupling units or at the same output coupling unit.

The disclosure also relates to laser systems for generating amplified output laser pulses with individually specified pulse energies at individually specified time points at an output, having a pulsed laser source for generating input laser pulses with the same pulse energy, having a selection unit for selecting some of the input laser pulses, having an optical amplifier for amplifying the selected input laser pulses, having an optical output coupling unit for coupling out at least one portion of the amplified laser pulses, and having a control unit that is programmed to temporally drive the selection and output coupling units in accordance with the above-described method. In some embodiments, the pulsed laser source can generate input laser pulses with the same temporal pulse interval, which is smaller than the temporal pulse interval between two neighboring output laser pulses.

The control unit can have a comparison unit, which compares the pulse intervals of the selected input laser pulses to a specified maximum time period and, if the pulse interval is too great, outputs a control signal to the selection unit or to an external pulse source to insert a sacrificial pulse into the pulse sequence of the selected input laser pulses.

The control unit can have a determination and comparison unit, which determines the expected pulse energy of the amplified output laser pulses in advance for the selected input laser pulses and compares them to the specified pulse energy and outputs a control signal to the output coupling unit to couple out an output laser pulse with the specified pulse energy.

The laser system can have a user request system, connected to the control unit, for individually specifying the pulse energies and/or shapes and the time points of the amplified output laser pulses at the output, and optionally an external pulse source (for example a pulsed diode, a CW diode with an optical switch or a diode with a fiber amplifier), for generating a sacrificial pulse that is to be inserted into the pulse sequence of the selected input laser pulses. In the case of an external pulse source, a wavelength-selective element (e.g., a dichroic mirror, diffractive element, Volume Bragg Grating (VBG)) for coupling out the sacrificial pulse can be upstream or downstream of the output coupling unit. In some embodiments, the external pulse source can have a different wavelength than the pulse source.

The selection and output coupling units each can have an acousto-optic modulator (AOM) or an electro-optic modulator (EOM).

The disclosure also relates to a control program product having code means adapted to carry out all the steps of the above-described method when the program is executed on a control unit of a laser system.

Further advantages and advantageous configurations of the subject matter of the invention are evident from the description, the claims, and the drawings. The aforementioned features and the features mentioned further below can likewise be employed in each case by themselves or in any desired combination. The embodiments shown and described should not be understood to be an exhaustive list, but rather have an exemplary character for the purpose of illustration.

In the following description of the drawings, identical reference signs are used for the same components or for components having the same function.

DETAILED DESCRIPTION

Figure 1:
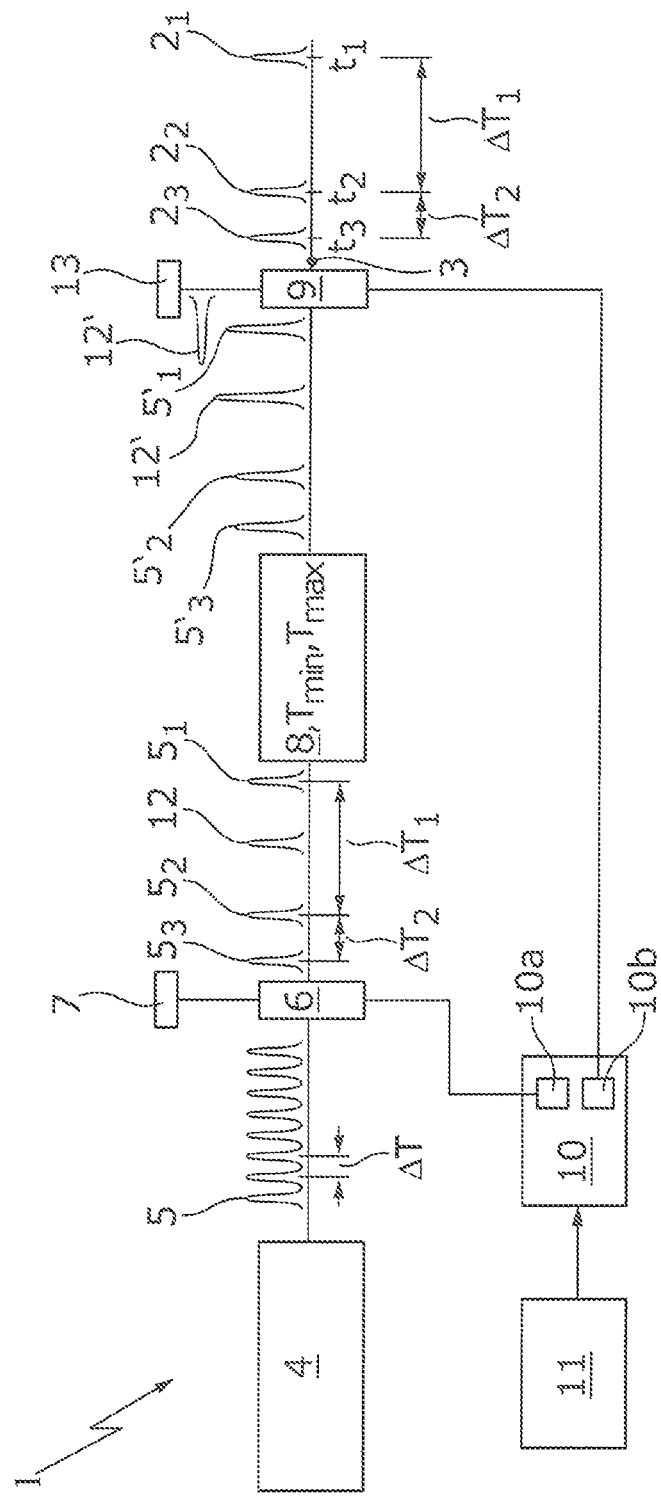
FIG. 1 schematically shows a first embodiment of a laser system for generating identical, amplified output laser pulses.

The laser system 1 shown in FIG. 1 generates a plurality of amplified output laser pulses $2_1$, $2_2$, $2_3$ (three shown in the figure) with individually specified pulse energies at individually specified time points at an output 3.

The laser system 1 includes a pulse source 4 for providing a pulse sequence of input laser pulses 5 with the same pulse energy and the same temporal pulse interval $\Delta t$, which is smaller by orders of magnitude than the temporal pulse interval $\Delta T_1$, $\Delta T_2$ between two neighboring output laser pulses $2_1$, $2_2$, $2_3$. The clock frequency of the input laser pulses 5 is fixed and lies in a frequency range of for example 10 MHz to 200 MHz. It is also possible for other pulsed sources to be used that do not generate equidistant pulses, for example, ps laser diodes.

The laser system 1 includes an optical selection device (pulse picker) 6, e.g., in the form of an input-side AOM (acousto-optic modulator) or EOM (electro-optic modulator), for the targeted selection or transmission of some of the input laser pulses 5. The selected input laser pulses $5_1$, $5_2$, $5_3$ are transmitted without deflection by the pulse picker 6, while the non-selected input laser pulses 5 are coupled out and directed onto an absorber 7. The selected input laser pulses $5_1$, $5_2$, $5_3$ selected correspond to specified time points, or are closest to the specified time points. The laser system 1 furthermore includes an optical amplifier 8 for amplifying the selected input laser pulses $5_1$, $5_2$, $5_3$, and an optical output coupling unit (output coupler) 9, for example in the form of an output-side AOM or EOM, for reducing the pulse energies of the amplified input laser pulses $5_1'$, $5_2'$, $5_3'$ to respectively specified pulse energies by targeted partial output coupling of the amplified input laser pulses $5_1'$, $5_2'$, $5_3'$. The amplifier 8 here has an amplification-free minimum time period $T_{min}$, which is specified by the inversion build-up necessary for a minimum amplification in the optical amplifier 8, and a maximum time period $T_{max}$, which is specified by the inversion build-up necessary for a maximum amplification in the optical amplifier 8. The minimum time period $T_{min}$ is based on the fact that, after a pulse amplification, the inversion in the gain medium of the amplifier 8 first has to be built up again so as to ensure a pulse-to-pulse stability. The maximum time period $T_{max}$ prevents pulse pauses that are too long and thus amplifications that are too large and result in undesirably excessive pulse increases. The amplified input laser pulses $5_1'$, $5_2'$, $5_3'$ arrive at the output 3 at the time points $t_1$, $t_2$, $t_3$ in the form of amplified output laser pulses $2_1$, $2_2$, $2_3$.

The laser system 1 furthermore includes a control unit 10, which temporally drives the pulse picker 6 and the output coupler 9 in accordance with a user request system 11, which requests amplified output laser pulses with individually settable pulse energy at the output 3 at individually settable time points. The control unit 10 can also control the pump power of the amplifier 8, which should be constant.

The following describes the function of the laser system 1 for the case that three amplified output laser pulses $2_1$, $2_2$, $2_3$ with the same pulse energy are requested at the time points $t_1$, $t_2$, $t_3$ at the output 3 by the user request system 11. It is assumed here that the temporal pulse interval $\Delta T_1$ between the first and the second output laser pulse $2_1$, $2_2$ is greater than the maximum time period $T_{max}$ and that the temporal pulse interval $\Delta T_2$ between the second and the third output laser pulse $2_2$, $2_3$ is smaller than the maximum time period $T_{max}$, but greater than the minimum time period $T_{min}$.

The control unit 10 temporally drives the pulse picker 6 such that, from among the input laser pulses 5, only the three that arrive at the output 3 at the respectively requested time points $t_1$, $t_2$, $t_3$ are transmitted. All the other input laser pulses 5 are directed onto the absorber 7 by the pulse picker 6.

Since the pulse interval $\Delta T_1$ between the first and the second input laser pulse $5_1$, $5_2$ to be amplified is greater than the maximum time period $T_{max}$, the control unit 10 inserts a sacrificial laser pulse 12 into the pulse sequence of the selected input laser pulses $5_1$, $5_2$, $5_3$ before the second input laser pulse $5_2$ to be amplified, the sacrificial laser pulse 12 being spaced apart from the second input pulse $5_2$ to be amplified at least by the minimum time period Tim, and at most by the maximum time period $T_{max}$. To this end, the pulse picker 6 is temporally driven by the control unit 10 to transmit a further one of the input laser pulses 5 as a sacrificial laser pulse 12.

The three selected input laser pulses $5_1$, $5_2$, $5_3$ and the sacrificial pulse 12 are amplified using the optical amplifier 8 to form the amplified laser pulses $5_1'$, $5_2'$, $5_3'$, $12'$. If the pulse interval between the amplified sacrificial laser pulse $12'$ and the preceding pulse is greater than the maximum time period $T_{max}$, the sacrificial laser pulse $12'$, as shown in FIG. 1, is greater than the pulses $5_1'$, $5_2'$, $5_3'$, because it undergoes greater amplification. The output coupler 9 is temporally driven by the control unit 10 in a manner such that the amplified sacrificial laser pulse $12'$ is coupled out and directed onto an absorber 13 and that all three amplified input laser pulses $5'_1$, $5'_2$, $5'_3$ are reduced to the same pulse energy. This reduction in energy is effected at the output coupler 9 by way of timed partial output coupling of the amplified input laser pulses $5'_1$, $5'_2$, $5'_3$ in dependence on the known pulse intervals thereof from the respectively immediately preceding, amplified input or sacrificial laser pulse $5'_1$, $5'_2$, $5'_3$, $12'$. The greater this pulse interval of an amplified input laser pulse $5'_1$, $5'_2$, $5'_3$ is, the greater is the inversion that has built up in the amplifier 8 and the greater is the pulse energy of the amplified input laser pulse $5'_1$, $5'_2$, $5'_3$. The three amplified output laser pulses $2_1$, $2_2$, $2_3$ with the same pulse energy arrive at the output 3 at the time points $t_1$, $t_2$, $t_3$.

If output laser pulses $2_1$, $2_2$, $2_3$ with different pulse energies are requested at the output 3, a corresponding reduction in energy is effected at the output coupler 9 by way of timed partial output coupling of the amplified input laser pulses $5'_1$, $5'_2$, $5'_3$ in dependence on the known pulse intervals thereof from the respectively immediately preceding, amplified input or sacrificial laser pulse $5'_1$, $5'_2$, $5'_3$, $12'$.

If the pulse interval of a requested amplifier pulse from the immediately preceding amplifier pulse is smaller than the minimum time period $T_{min}$, a different input laser pulse is selected instead of the input laser pulse that is actually to be selected, the temporal pulse interval of which from the immediately preceding, selected input laser pulse is identical to or minimally greater than the minimum time period $T_{min}$. The pulse picker 6 is thus driven with a time delay, for example by way of a delay signal being superposed on the actual selection signal and by an input laser pulse being selected, the temporal pulse interval of which is identical to or minimally greater than the minimum time period $T_{min}$. All the electrical trigger signals selecting the input laser pulses can be subjected to a delay $T_{min}$ by the user request system 11, with the result that the minimum time period $T_{min}$ is maintained for all trigger signals and sacrificial pulses can be inserted, if appropriate. In other words, all the pulses are subjected to a fixed delay. The minimum time period $T_{min}$ is at least long enough for an assessment as to whether sacrificial pulses are required to be able to be performed by the control unit 10.

The control unit 10 can have a comparison unit 10a, which compares the pulse intervals $\Delta T_1$, $\Delta T_2$ of the selected input laser pulses $5_1$, $5_2$, $5_3$ to the specified maximum time period $T_{max}$ and, if the pulse interval is too great, outputs a control signal to the pulse picker 6 to insert a sacrificial pulse 12 into the pulse sequence of the selected input laser pulses $5_1$, $5_2$, $5_3$. The control unit 10 can furthermore have a determination and comparison unit 10b, which determines the expected pulse energy of the amplified output laser pulses $2_1$, $2_2$, $2_3$ in advance for the selected input laser pulses $5_1$, $5_2$, $5_3$ and compares them to the specified pulse energy and outputs a control signal to the output coupler 9 to couple out an output laser pulse $2_1$, $2_2$, $2_3$ with the specified pulse energy.

Figure 2:
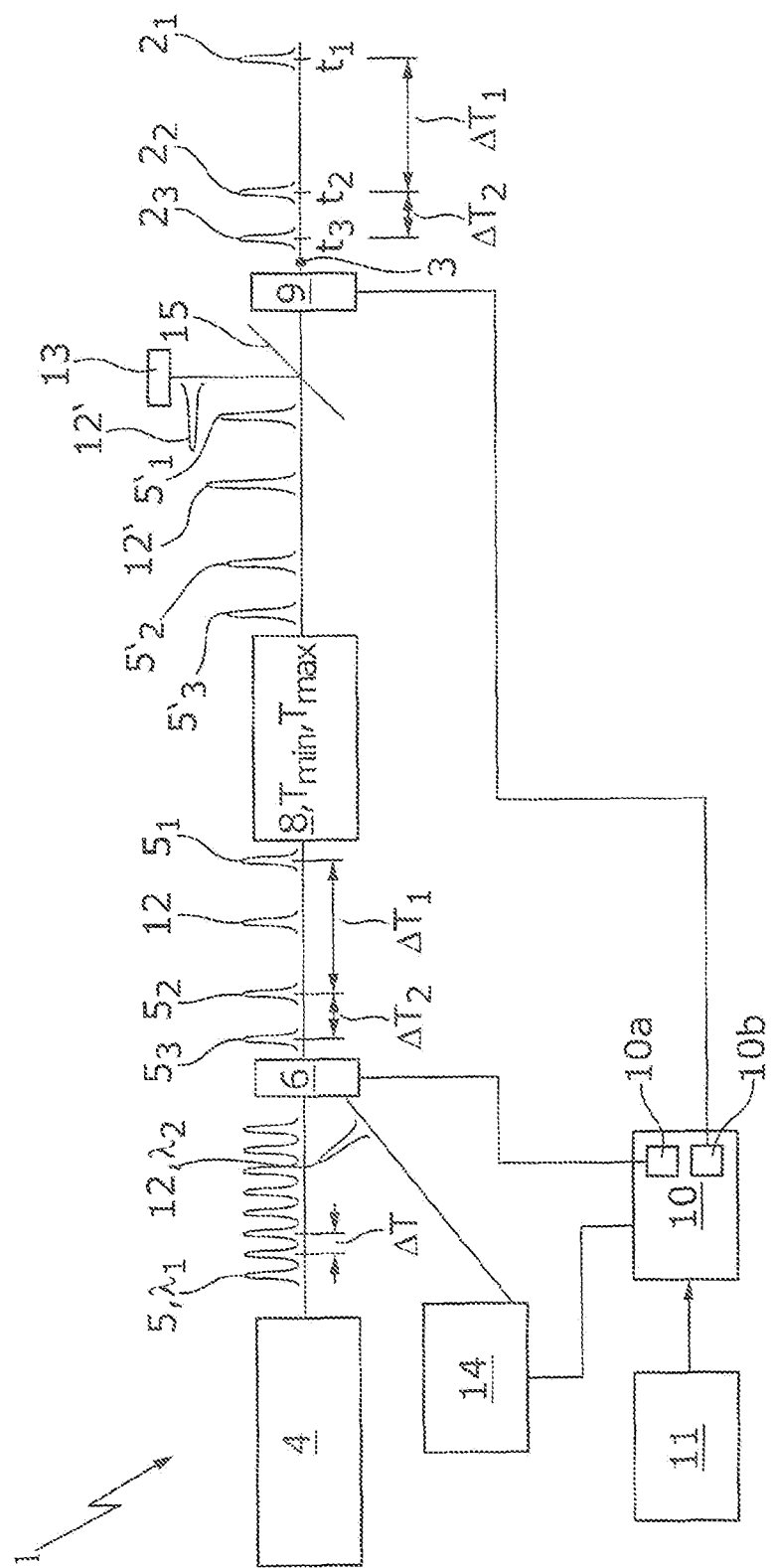
FIG. 2 schematically shows a second embodiment of a laser system for generating identical, amplified output laser pulses.

The laser system 1 shown in FIG. 2 differs from the laser system of FIG. 1 in that the sacrificial pulse 12 is generated here by an external pulse source (e.g., a laser diode) 14 that is driven by the control unit 10. The sacrificial pulse 12 can have the same wavelength $\lambda_1$ as the input laser pulses 5 or, as in FIG. 2, a different wavelength $\lambda_2$. The sacrificial pulse 12 is inserted by the control unit 10 into the pulse sequence of the selected input laser pulses $5_1$, $5_2$, $5_3$, and the amplified sacrificial pulse $12'$ is coupled out by a wavelength-selective element 15 (e.g. a dichroic mirror, diffractive element, VBG, upstream of the output coupler 9, and directed onto the absorber 13. Unlike the case shown in FIG. 2, the amplified sacrificial pulse 12' can also overlap with one of the pulses $5_1'$, $5_2'$, $5_3'$.

The methods described function on account of the temporal driving of the pulse picker 6 and of the output coupler 9 by way of the control unit 10, that is to say no regulation is performed.

The laser systems 1 shown in FIGS. 1 and 2 can additionally be subject to a regulation of the pump power and to a regulation of the pulse energy of the input laser pulses 5.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A method for generating amplified output laser pulses with individually specified pulse energies at individually specified time points at an output, the method comprising:
providing a pulse sequence of input laser pulses, each having the same pulse energy;
selecting the input laser pulses that arrive at the output at the specified time points or closest to the specified time points;
amplifying the selected input laser pulses using an optical amplifier having an amplification-free minimum time period and an amplification-free maximum time period,
wherein if a temporal pulse interval between first and second successive input laser pulses is greater than the maximum time period,
inserting at least one sacrificial laser pulse before the second successive input laser pulse into the pulse sequence of the selected input laser pulses, wherein the sacrificial laser pulse is spaced apart from the second successive input pulse by at least the minimum time period and by at most the maximum time period;
amplifying the at least one sacrificial laser pulse; and
coupling the at least one amplified sacrificial laser pulse out of a pulse sequence of the amplified input pulses upstream of the output; and
reducing the pulse energies of the amplified input laser pulses to the specified pulse energies by way of timed partial output coupling in dependence on their pulse intervals from a respectively immediately preceding amplified input or sacrificial laser pulse.

2. The method of claim 1, wherein expected pulse energy of the amplified output laser pulses is determined in advance for the selected input laser pulses, and the partial output coupling is controlled on the basis of a comparison of the expected pulse energy to the specified pulse energy.

3. The method of claim 2, wherein expected pulse energy is determined from simulated behavior of the optical amplifier in dependence on the pulse interval and pulse energy of the selected input laser pulses and a pump power of the amplifier.

4. The method of claim 1, wherein all the amplified output laser pulses have the same pulse energy.

5. The method of claim 1, wherein instead of a selected input laser pulse, the temporal pulse interval of which from an immediately preceding, selected input laser pulse that is smaller than the minimum time period ($T_{min}$), a different input laser pulse that has a temporal pulse interval from an immediately preceding, selected input laser pulse that is identical to or minimally greater than the minimum time period is selected.

6. The method of claim 1, wherein the at least one sacrificial laser pulse is one of the input laser pulses.

7. The method of claim 1, wherein the at least one sacrificial laser pulse is an external laser pulse.

8. The method of claim 7, wherein the external laser pulse has a different wavelength than a wavelength of the input laser.

9. The method of claim 1, wherein the temporal pulse interval between two neighboring output laser pulses is greater by at least one order of magnitude than the temporal pulse interval of the input laser pulses.

10. The method of claim 1, wherein the at least one sacrificial laser pulse is inserted into the pulse sequence of the selected input laser pulses before a first selected input laser pulse.

11. The method of claim 1, wherein reducing the pulse energies of the amplified input laser pulses and the output coupling of the amplified sacrificial laser pulse are effected at the same optical output coupler.

12. The method of claim 1, wherein the temporal pulse interval between the input laser pulses is the same and smaller than the temporal pulse interval between two neighboring output laser pulses.

13. A laser system for generating amplified output laser pulses with individually specified pulse energies at individually specified time points at an output, comprising:
a pulse source for generating input laser pulses with a same pulse energy,
an optical selection device for selecting some of the input laser pulses,
an optical amplifier for amplifying the selected input laser pulses,
an output coupling unit for coupling out at least one portion of the amplified laser pulses, and
a control unit, which is programmed to temporally drive the selection unit and the output coupling unit using a method comprising:
providing a pulse sequence of the input laser pulses;
selecting the input laser pulses that arrive at the output at the specified time points or closest to the specified time points;
amplifying the selected input laser pulses using the optical amplifier having an amplification-free minimum time period and an amplification-free maximum time period,
wherein if a temporal pulse interval between first and second successive input laser pulses is greater than the maximum time period,
inserting at least one sacrificial laser pulse before the second successive input laser pulse into the pulse sequence of the selected input laser pulses, wherein the sacrificial laser pulse is spaced apart from the second successive input pulse by at least the minimum time period and by at most the maximum time period;
amplifying the at least one sacrificial laser pulse; and
coupling the at least one amplified sacrificial laser pulse out of a pulse sequence of the amplified input pulses upstream of the output; and
reducing the pulse energies of the amplified input laser pulses to the specified pulse energies by way of timed partial output coupling in dependence on their pulse intervals from a respectively immediately preceding amplified input or sacrificial laser pulse.

14. The laser system of claim 13, further comprising an external pulse source that is configured for generating a sacrificial pulse that is to be inserted into the pulse sequence of the selected input laser pulses.

15. The laser system of claim 14, wherein the external pulse source has a different wavelength than the pulse source.

16. The laser system of claim 13, wherein the control unit comprises a comparison unit that compares the pulse intervals of the selected input laser pulses to a specified maximum time period and outputs a control signal to the selection unit or to the external pulse source to insert a sacrificial pulse into the pulse sequence of the selected input laser pulses if the pulse interval is greater than the maximum time period.

17. The laser system of claim 13, wherein the control unit has a determination and comparison unit configured to determine an expected pulse energy of the amplified output laser pulses in advance for the selected input laser pulses and compare them to the specified pulse energy and outputs a control signal to the output coupling unit to couple out an output laser pulse with the specified pulse energy.

18. The laser system of claim 13, further comprising a user request system connected to the control unit configured for individually specifying the pulse energies, pulse shapes, or the time points of the output laser pulses at the output.

19. The laser system of claim 13, wherein one or both of the selection unit and the output coupling unit has an acousto-optic modulator or an electro-optic modulator.

20. The laser system of claim 13, further comprising a wavelength-selective element for coupling out laser light having a different wavelength than the pulse source that is upstream or downstream of the output coupling unit.

21. The laser system of claim 13, wherein the pulse source generates the input laser pulses with a same temporal pulse interval that is smaller than a temporal pulse interval between two neighboring output laser pulses.

22. One or more computer readable non-transitory media storing instructions that are executable by a control unit of a laser system, and upon such execution cause the control unit of a laser system to perform operations including a method for generating amplified output laser pulses with individually specified pulse energies at individually specified time points at an output, the method comprising:
providing a pulse sequence of input laser pulses, each having the same pulse energy;
selecting the input laser pulses that arrive at the output at the specified time points or closest to the specified time points;
amplifying the selected input laser pulses using an optical amplifier having an amplification-free minimum time period and an amplification-free maximum time period,
wherein if a temporal pulse interval between first and second successive input laser pulses is greater than the maximum time period,
inserting at least one sacrificial laser pulse before the second successive input laser pulse into the pulse sequence of the selected input laser pulses, wherein the sacrificial laser pulse is spaced apart from the second successive input pulse by at least the minimum time period and by at most the maximum time period;
amplifying the at least one sacrificial laser pulse; and
coupling the at least one amplified sacrificial laser pulse out of a pulse sequence of the amplified input pulses upstream of the output; and
reducing the pulse energies of the amplified input laser pulses to the specified pulse energies by way of timed partial output coupling in dependence on their pulse intervals from a respectively immediately preceding amplified input or sacrificial laser pulse.

* * * * *